United States Patent [19]
Hayworth

[11] 3,941,291
[45] Mar. 2, 1976

[54] PALLET JIG AND TABLE

[76] Inventor: Leil W. Hayworth, 846 Hill St., Spearfish, S. Dak. 57783

[22] Filed: Aug. 9, 1974

[21] Appl. No.: 496,261

[52] U.S. Cl. .................................. 227/152; 227/130
[51] Int. Cl.² ............................................. B25C 7/00
[58] Field of Search ............ 227/27, 130, 152, 154; 144/288 C; 29/200 P; 269/43, 44, 321 F

[56] References Cited
UNITED STATES PATENTS

| | | | |
|---|---|---|---|
| 1,525,227 | 2/1925 | Closson | 269/43 |
| 1,965,780 | 7/1934 | Odland | 269/44 |
| 2,626,643 | 1/1953 | Kantzler | 269/321 F |
| 3,495,755 | 2/1970 | Willis et al. | 227/130 |

*Primary Examiner*—Granville Y. Custer, Jr.
*Attorney, Agent, or Firm*—Beall & Jeffery

[57] ABSTRACT

An assembly for manufacturing wood pallets including a pair of spaced jigs mounted to a table or like supporting frame at a convenient working height. Each jig is constructed and arranged to receive the wood components of the jig, and an upwardly extending center post is mounted on the table between the pallet jigs. A pneumatically operated nailer is pivotally mounted from the center post by a pair of swing arms whereby the nailer can be moved to any area above either of the pallet jigs for securing the pallet together during assembly thereof.

8 Claims, 9 Drawing Figures

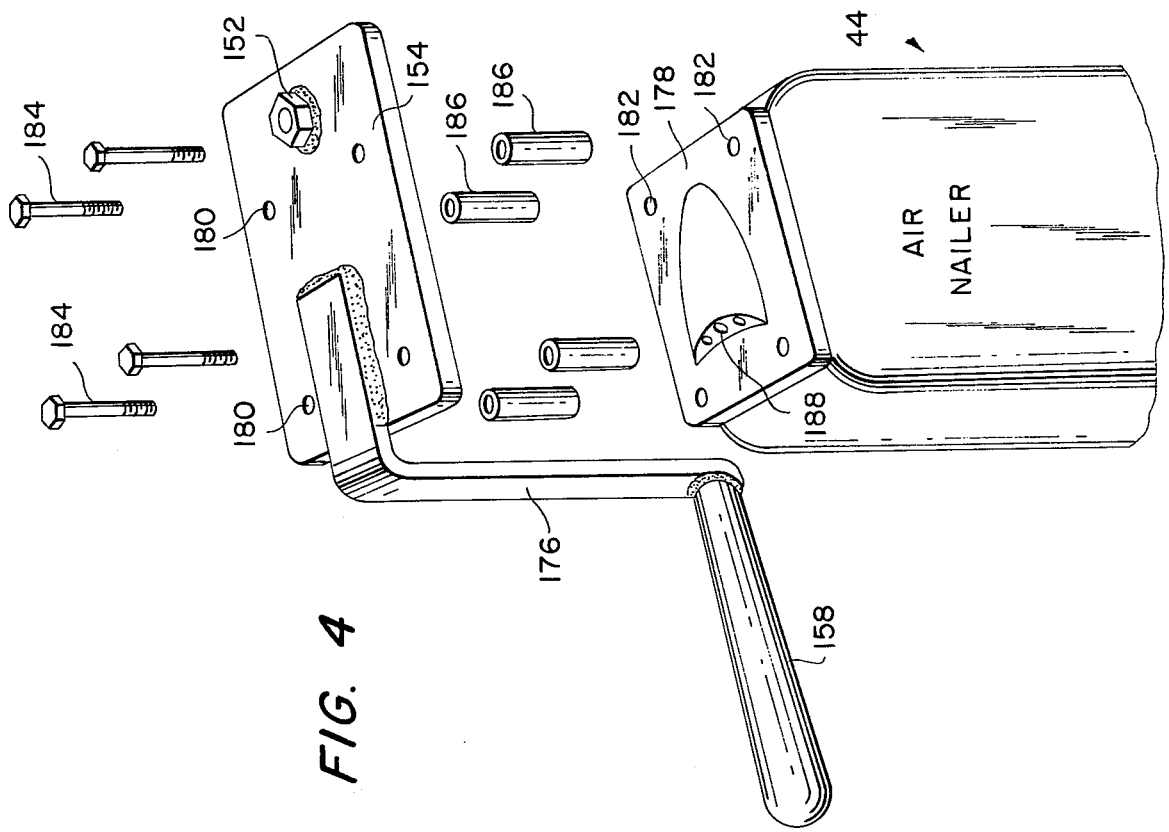
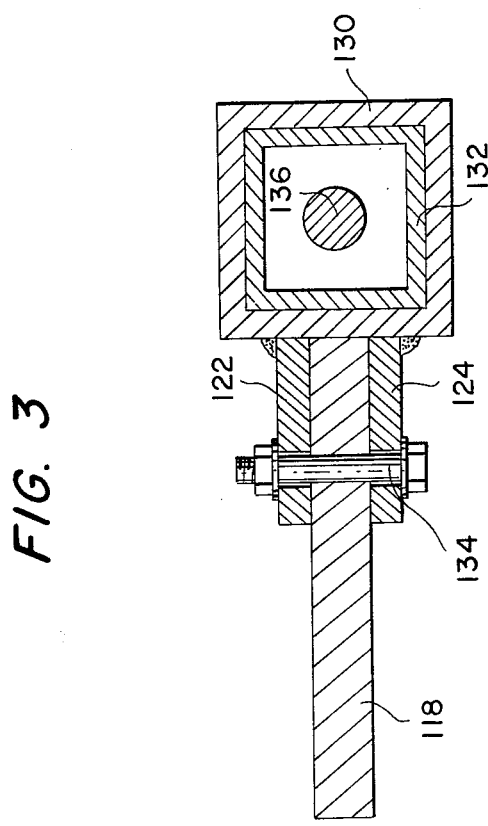

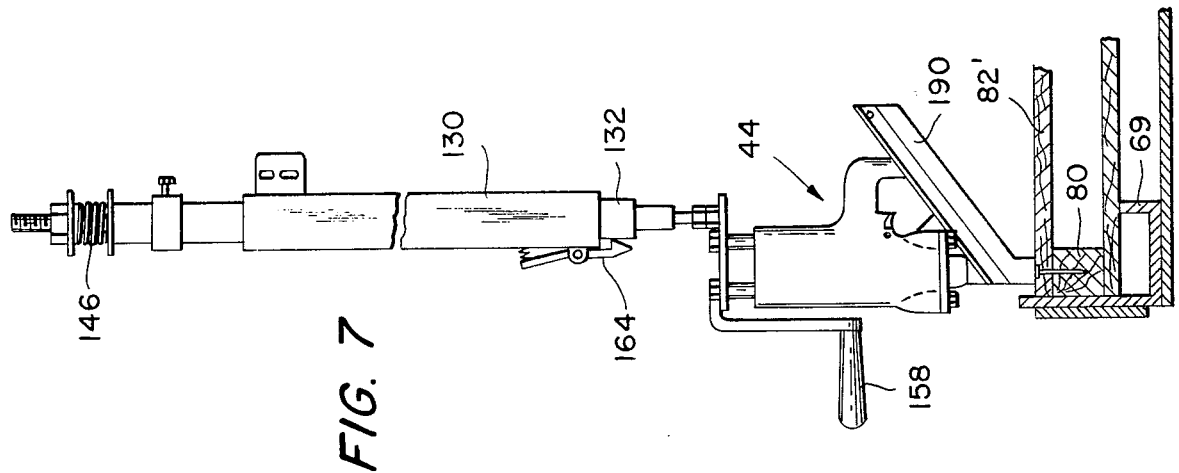
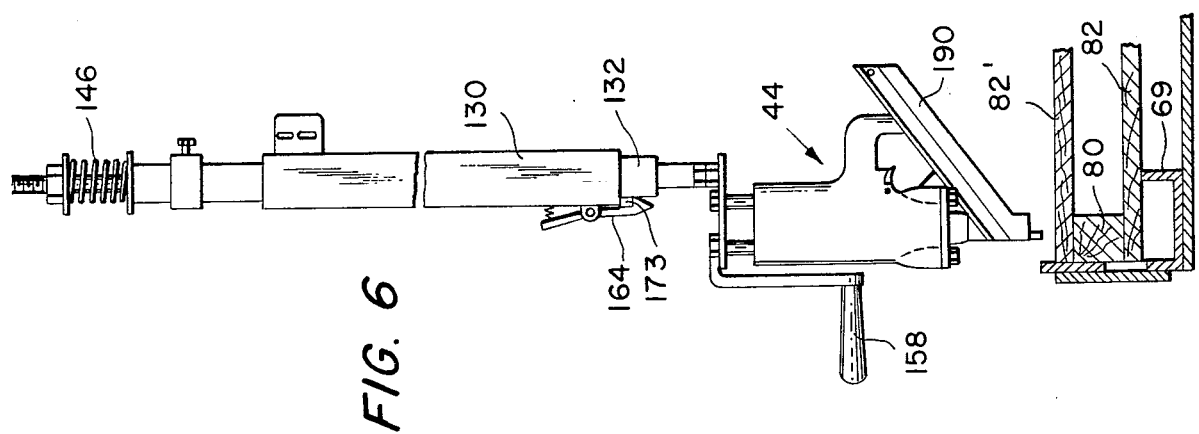
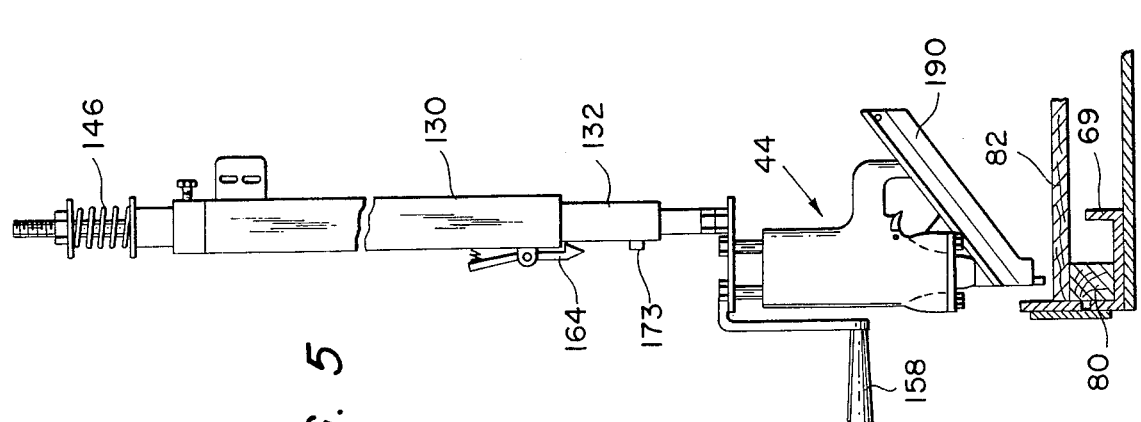

PALLET JIG AND TABLE

BACKGROUND OF THE INVENTION

The invention relates as indicated to a pallet jig and table, and relates more particularly to a jig and table assembly for manufacturing pallets which are widely used in industry for various purposes. Generally described, the pallets comprise at least one, and normally two supporting surfaces or platforms which are spaced by beams or runners which extend perpendicular to the supporting surfaces in spaced relation. In the manufacture of wooden pallets, the boards which form the supporting surfaces at both the top and bottom of the pallet are spaced at desired intervals along such surface and nailed to the beams or runners to form a rigid frame assembly.

In order to facilitate handling of the pallets by means of fork-lift trucks or similar powered vehicles with lift capabilities, the beams or runners and the platform boards are appropriately dimensioned and are cut to such dimensions thereby presenting planar sides and ends. It is therefore necessary that in the assembly of the boards on the beams or runners, the latter must be fairly accurately positioned and aligned so as to properly receive the boards which form the platform surfaces. The boards may be precut prior to assembly, or cut following the fastening of the boards to the beams or runners, with nailing being the usual means for effecting such fastening.

In order to faciliate the manufacture of pallets the type described, various assemblies and machines have been proposed all of which have the common objective of reducing man power to the extent possible and to produce consistently dimensioned pallets which are rigidly held together. Examples of prior art techniques of pallet manufacture which provide at least partially automatic operation are shown in U.S. Pat. Nos. 3,046,558 and 3,591,067. Although the stated objectives have been apparently achieved in accordance with the structures disclosed in these patents, the mechanisms for doing so are quite complicated and expensive.

U.S. Pat. Nos. 2,749,873 and 2,958,351 relates to jigs for constructing wooden units, with the latter patent relating specifically to the assembling of skids which are comparable in function to pallets. In both of such patents, the jigs are constructed and arranged to receive the materials to be assembled in a particularly aligned manner so as to facilitate the securing of the components together.

SUMMARY OF THE PRESENT INVENTION

The primary object of the present invention is to provide a jig and table assembly in accordance with which the hand assembly of pallets can be more efficiently effected. In accordance with the invention, a supporting table has mounted thereon a pair of pallet jigs in spaced relation on the table, with a supporting post being secured to the table between the jigs and extending vertically upwardly therefrom. Pivotally mounted to the support post are swinging arms at the end of which is mounted an air nailer for securing the wood components of the pallet in their arranged position on the pallet jigs. The mounting of the air nailer is such that the same may be used at either jig with equal facility.

A further object of the present invention is to provide a pallet jig and table assembly in which certain components of each jig are adjustable so as to accommodate stock of varying dimension thereby adapting the jigs to construction of various type pallets.

A still further object of the present invention is to provide a pallet jig of the type described in which resilient means bias the beams or runners of the pallet to their proper positions on the pallet jig whereby such beams or runners are accurately aligned for receiving the top and bottom boards or slats which complete the pallet. The resilient biasing means are constructed and mounted on the jig so as to accommodate stock of varying dimension.

A still further object of the present invention is to provide a pallet jig which is constructed so as to accommodate and align the partially completed pallet when the same is inverted so as to receive the second series of slabs or boards to complete the other supporting surface of the pallet.

Yet another object of the present invention is to provide a pallet jig and table assembly which is simple in construction and which can be manufactured at relatively low costs, and which is efficient in operation.

These and other objects of the present invention will be apparent as the following description proceeds in particular reference to the application drawings.

BRIEF DESCRIPTION OF THE APPLICATION DRAWINGS

In the drawings:

FIG. 3 is a sectional view taken on line 3—3 of FIG. 1;

FIG. 4 is an exploded view of the upper portion of the air nailer housing to which is attached an operating handle for facilitating vertical movement of the air nailer in use thereof;

FIG. 5 is a side elevational view, partially fragmented, showing the air nailer in a down position just prior to nailing a first row of slats or boards to the transverse beams or runners;

FIG. 6 is a side elevational view similar to FIG. 5 showing the air nailer in a relatively raised position just prior to nailing the second set of boards or slats to the beam or runner after the pallet has been inverted;

FIG. 7 is a side elevational view similar to FIGS. 5 and 6 showing a nail being applied to the pallet when the same is in its FIG. 6 position;

DETAILED DESCRIPTION OF THE PREFERRED EMBODIMENT

Figure 1:
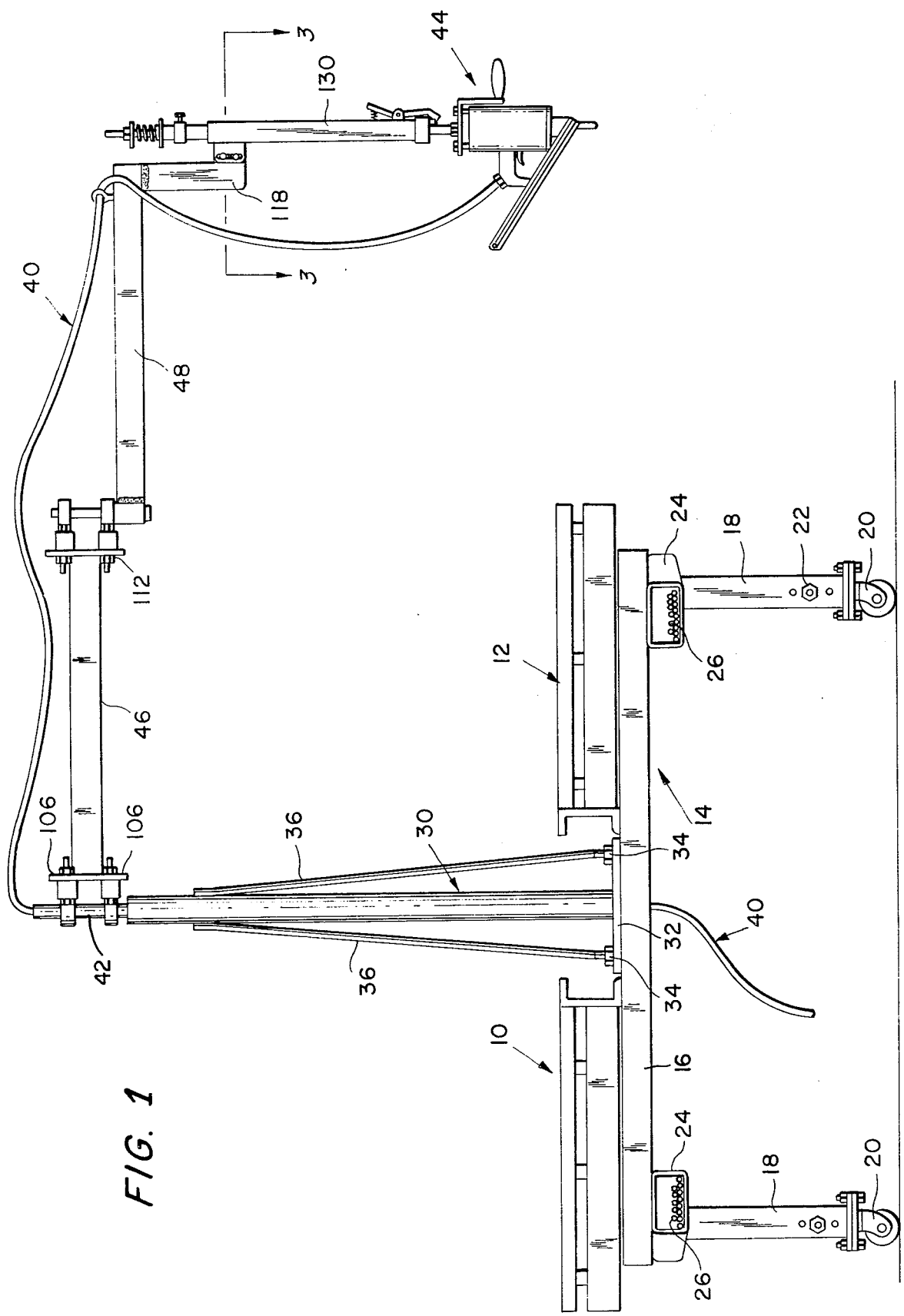
FIG. 1 is a side elevational view of the pallet jig and table constructed in accordance with the present invention, with the air nailer being shown fully extended at one side of the apparatus.

Referring now in more detail to the application drawings, wherein like parts are indicated by like reference numerals, and initially to FIG. 1, pallet jigs generally indicated at 10 and 12 are mounted in spaced relation on a supporting table generally indicated at 14. The table is of generally rectangular frame construction, with only the longitudinal frame member 16 being visible in this figure. The table is supported by legs commonly designated at 18 provided at each corner of the table, with casters 20 being carried at the bottom of each leg to facilitate rolling movement of the entire assembly. Although not shown in FIG. 1, the legs 18 comprise an inner telescoping member to which the casters are carried which extends upwardly within the main supporting leg for vertical adjustment relative thereto. Both the outer and inner telescoping legs are formed with openings which can be aligned, and a headed bolt or pin 22 extends through such aligned openings for maintaining the telescoping members in their vertically adjusted position. In this manner, the working height of the table 14 and thus the pallet jigs can be adjusted to accommodate the most convenient working height of the person or persons assembling the pallets on the jigs.

Nail pockets commonly designated at 24 are secured to the frame 14 for holding a supply of nails 26 for feeding the air nailer. Pockets 24 are conveniently located at each corner of the table to supply the assembler regardless of his position around the table.

Mounted on the table 14 between the pallet jigs 10 and 12 is a center post generally indicated at 30, which is supported on plate 32 which is in turn rigidly mounted to the frame by nut and bolt assemblies 34. A plurality of braces commonly designated at 36 are welded or otherwise secured to the plate 32 at their lower ends and to the center post 30 at their upper ends to rigidify the mounting of the center post, particularly adjacent the top thereof.

The center post 30 is hollow and an air line generally indicated at 40 extends upwardly through the center post, with the line being housed in a sleeve 42 the top of which extends above the top of the center post 30. The air line 40 extends to an air nailer generally indicated at 44 for operating the same. The nailer 44 is pivotally mounted on the center post 30 through swing arms 46 and 48, with the structural details of the nailer mounting described hereinbelow when particular reference is made to FIGS. 2–4 of the application drawings.

Figure 8:
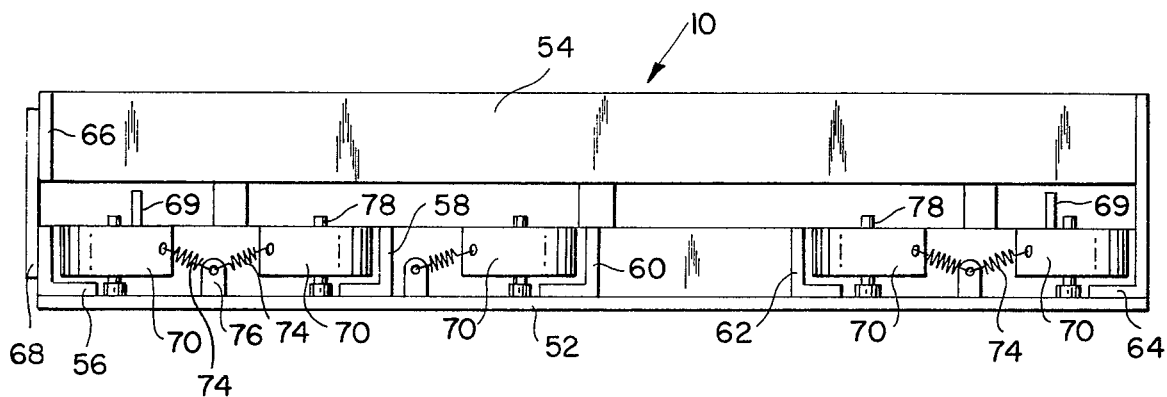
FIG. 8 is a sectional view of one of the pallet jig units, taken on line 8—8 of FIG. 9.
Figure 9:
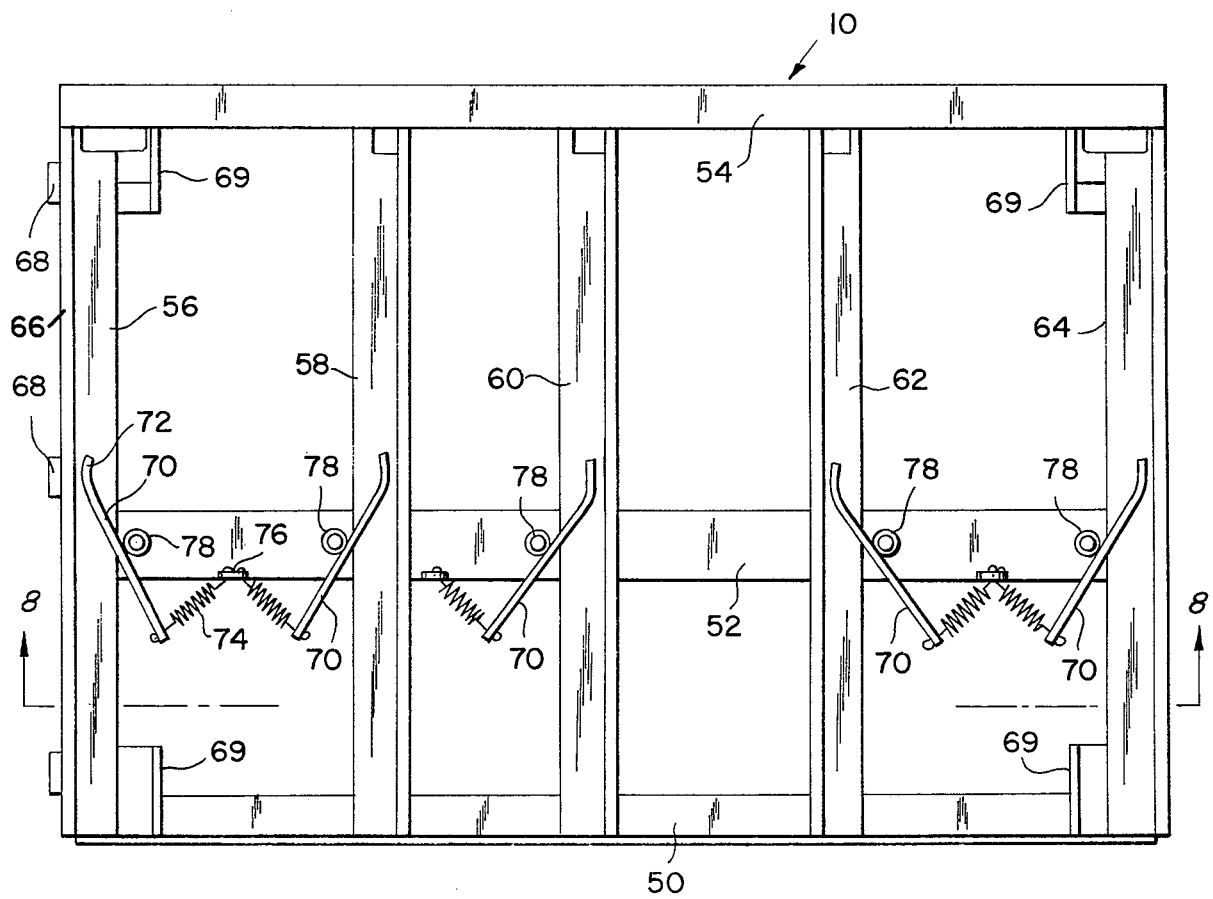
FIG. 9 is a top plan view of the jig unit shown in FIG. 8.

Referring now to the construction of the pallet jigs 10 and 12, reference is made to FIGS. 8 and 9. Each of the jigs 10 and 12 are identical in construction, and the description of the jig 10 as shown in these figures will be understood to apply to the jig 12 as well.

The jig 10 includes longitudinally extending frame members 50, 52 and 54 rigidly secured to the table 14. The frame member 54 is generally L-shape and extends vertically upwardly to form the inner side of the jig adjacent the center post 30. The frame member 54 serves as a stop guide or fence for the beams when they are positioned in the jig as will be presently described.

L-shaped angle members 56, 58, 60, 62 and 64 extend transversely of the jig and are rigidly secured to the longitudinal frame members 50, 52 and 54. The vertical leg of the angle member 56 is connected to a transverse frame member 66 positioned thereabove by means of braces 68, with the frame member 66 being co-extensive at its upper end with the longitudinal frame member 54 and defining the rear side of the jig. The frame member 66 serves as a stop or fence for the boards to be positioned on the beams. The transverse members 56–64 can be rigidly secured to the longitudinal frame members in any suitable manner, for example by welding or by fasteners. It will be noted that the side of the jig opposite the frame member 54 is open to facilitate placement of the beams in the jig.

Angle members commonly designated at 69 are mounted at each corner of the jig for supporting the pallet when the same has been inverted following the application of the first series of boards to the transverse beams or runners. The top surfaces of the angle members 69 terminate in the same plane to provide a level support for the pallet when so inverted.

A resiliently biased keeper is associated with each of the angle members 56–64 for biasing and retaining the beams or runners in position on the jig. Each keeper is commonly designated at 70 and includes a curved end portion 72 generally planar with the vertical wall of the adjacent angle member, with the opposite end of the keeper being connected to a coil spring 74 the opposite end of which is in turn secured to a bracket 76 mounted on and extending upwardly from the longitudinal frame member 52. A plurality of keeper sleeves commonly designated at 78 are mounted on the same longitudinal frame member 52 and extend upwardly therefrom for contacting the keeper 70 and controlling the position thereof relative to the adjacent angle member. It will be seen from FIG. 9 that a beam or runner can be inserted from a direction from bottom to top in this figure between the curved end surface 72 of the keeper and the vertical leg of the angle member 56 with the keeper being cammed clockwise about the sleeve 78 against the bias of the spring 74, assuming of course that the width of the beam or runner exceeds the normal spacing between the biased keeper and the adjacent angle member.

In the same manner, it will be seen that all the keepers 70 bias the transversely positioned beams or runners against the angle members supporting the same for precise alignment of the beams or runners for application of the surface boards or slats thereto. FIG. 5 shows a transverse beam 80 positioned against the adjacent angle member, and a slat or board shown at 82 positioned on the beam 80 prior to being nailed thereto. It will be understood that similar beams 80 are disposed adjacent each of the transverse angle members 56–64. It will also be apparent that the transverse beams 80 extend into engagement with longitudinal frame member 54, with the opposite ends of the beams terminating relatively adjacent the outside edge of the longitudinal frame member 50. The beams can be cut and squared at such end if the beams have not been precisely cut for length prior to assembly of the pallet.

After the beams 80 have been positioned on the jig 10 in the manner described, the boards or slats 82 are positioned on the beams 80 with the first such board being squared against the upstanding longitudinal member 54 and at its leading end against the transverse frame member 66. Additional boards 82 are then positioned in the same manner, with such boards being spaced from each other in a predetermined manner. The nailing of the individual boards can be effected after each board has been positioned on the transverse beams, or the nailing can be completed after all the boards have been positioned in place. It will be noted, as viewed in FIG. 9, that the right end of the jig is open whereby the ends of the boards 82 can be cut and squared as necessary. The spacing of the boards 82 on the beams 80 is not critical.

Figure 2:
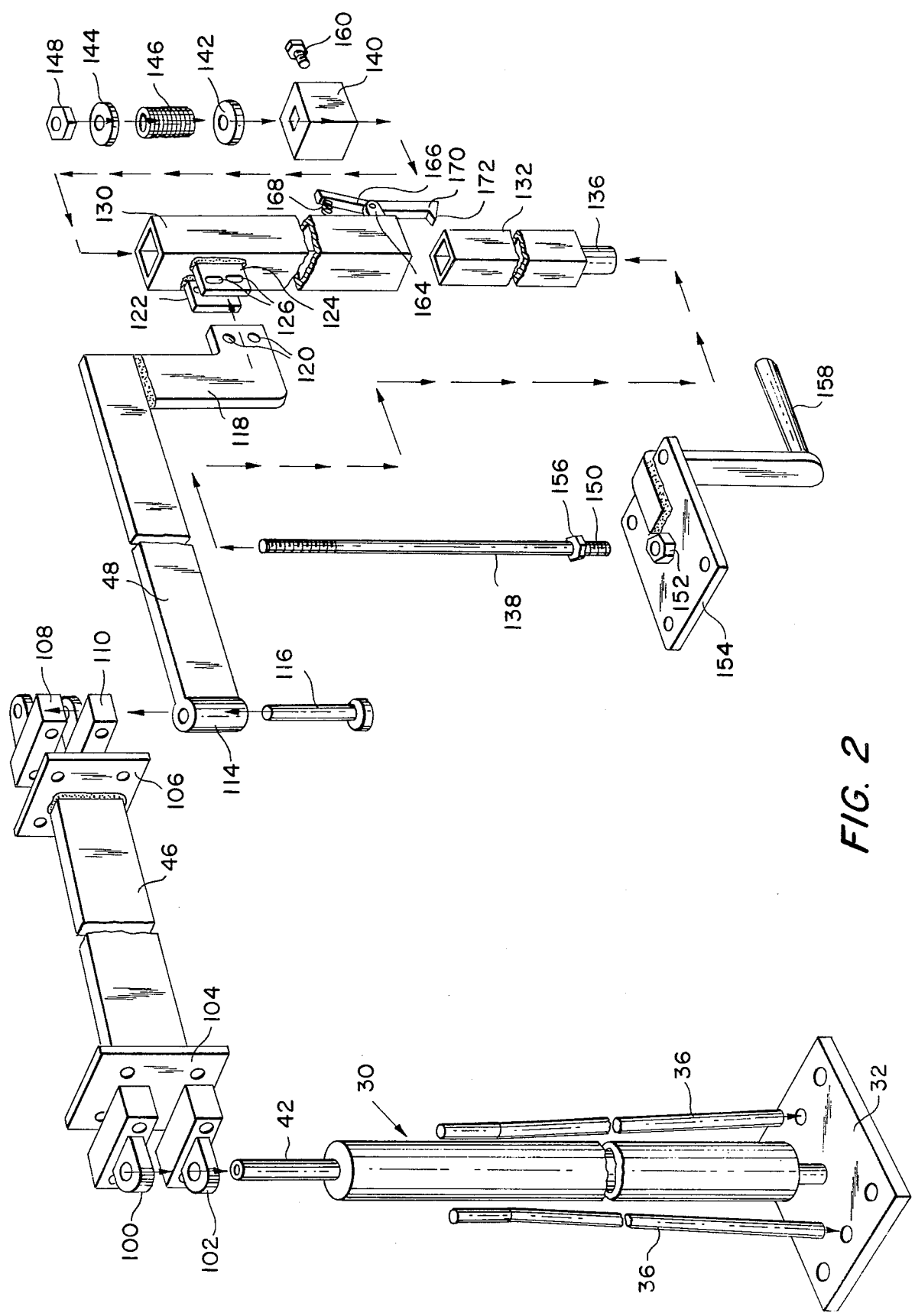
FIG. 2 is an exploded view of the center post and the means for pivotally mounting the air nailer on such post.

Referring now to FIGS. 2–4, FIG. 2 comprises an exploded view of the center post 30 and the supporting assembly for the air nailer. As disclosed, the sleeve 42 within which is disposed the air line 40 extends above the center post and pillow block bearings 100 and 102 are positioned around the sleeve or spindle 42, with the bearings being secured to a mounting plate 104 by means of nut and bolt assemblies shown at 106 in FIG. 1. The mounting plate is rigidly secured to swing arm 46 the opposite end of which is similarly mounted to a mounting plate 106 which carries pillow block bearings 108 and 110 through nut and bolt assemblies 112, FIG. 1.

Swing arm 48 is formed with a generally cylindrical end portion 114 which is adapted to be aligned with the pillow blocks 108 and 110 for receiving a pin 116 thereby permitting rotation of the swing arm 48 relative to the swing arm 46. The opposite end of the swing arm 48 carries a generally L-shaped mounting arm 118 the end of which is formed with openings 120. The end of the arm 118 extends between brackets 122 and 124 both of which are formed with openings commonly designated at 126 which can be aligned with the openings 120 but which are generally elongated to permit relative vertical adjustment of the swing arm relative to the brackets. The brackets 122 and 124 are secured, for example, by welding, to a generally square, hollow post 130 which telescopically receives a relatively smaller hollow post 132, as shown in section in FIG. 3, which figure also shows the nut and bolt assembly 134 for securing the arm 118 to the brackets 122 and 124.

A spindle 136 extends from the bottom of the post 132, and a shaft 138 extends upwardly through the spindle 136 and the posts 132 and 130. Positioned at the top of the post 130 is a cap member 140, washers 142 and 144, a spring 146, and a nut 148 which is adapted to threadedly engage the upper end of the shaft 138. The lower end of the shaft is also threaded as shown at 150 for threaded engagement with a nut 152 mounted on handle plate 154, with a lock nut 156 being provided at the lower end of the shaft to secure the same in its locked position.

When the members just described have been assembled, the spring 146 is under compression and normally biases the shaft 138, and thus the handle plate 154, upwardly away from the work area. When the handle 158 is lowered to effect the nailing of the boards, the spring 146 is tensioned and serves to return the plate 154, to which the nailer is mounted as will be presently described, to its upper, withdrawn position. A set screw 160 extends through a threaded opening therefor in the cap 140 to maintain the elements in their adjusted position. The cap 140 limits down travel of the post 132 thereby to accommodate pallets of varying thickness.

The post 130 carries a latch assembly which includes a bracket 164 mounted on the post, an upper latch member 166 which is biased away from the post by means of spring 168, and a lower latch member 170 having a pawl end 172. Both latch members 168 and 170 are pivotally mounted to the bracket 164 by pin means or the like so that depression of the latch member 166 toward the post 130 against the bias of spring 168 serves to release the pawl end 172 from engagement with the lower post 132, when it is desired to raise or lower these members. The bottom post 132 is provided with a projection 173 (FIGS. 5 and 6) for engagement by the pawl 172 to effect the desired vertical adjustment of these members.

Referring now to FIG. 4, the mounting plate 154, to which the operating handle 158 is connected through arm 176, is mounted to the top mounting plate 178 of the air nailer 44 as follows. A plurality of openings commonly designated at 180 are drilled in the mounting plate 154, which correspond in diameter and spacing to threaded openings commonly designated at 182 formed in the plate 178. A plurality of mounting screws commonly designated at 184 extend through the openings 180, downwardly through spacers 186 into threaded engagement with the openings 182 in plate 178 thereby to firmly mount the plate 154 and thus the operating handle 158 to the nailer 44. The mounting of the plate 154 in spaced relation to the top of the nailer is desirable in order to leave exposed the air outlet ports 188 provided just above the mounting plate 178.

The manner in which the nailer 44 operates will be apparent by reference to FIGS. 5–7. The positioning of the transverse beams 80 and boards 82 has been previously described, and in FIG. 5 the nailer 44 is shown just prior to the nailing operation. The nailer is of conventional construction and includes a nail tube 190 which is adapted to receive and feed nails to the discharge end of the nailer in a manner well known in the art. To effect nailing, the nailer is pushed down by means of the operating handle 158, with engagement of the nailer with the board 82 releasing a safety device provided on the nailer at the nose thereof to actuate the air supply for driving the nail through the board 82 into the beam 80. The safety device referred to is likewise a well known feature on nailers of this general type. When the handle 158 is lowered, the spring 146 is tensioned, and the nailer 44 is automatically raised when pressure on the operating handle 158 is released following the nailing operation. The nailer 44 can then be moved to the next nailing position, with such movement being permitted through the pivotal mounting of the swing arms 46 and 48 as above described. The nailer can reach any location on either pallet jig 10 or 12 owing to such mounting, which constitutes an important part of the present invention.

After all the boards 82 have been nailed in place on the transverse beams 80, the partially completed pallet is inverted, that is, the boards 82 assume a bottom position with the beams 80 extending upwardly therefrom as shown in FIG. 6. The boards 82 in such position are supported by the angle irons 69 previously referred to in the description of FIGS. 8–9. A further layer of boards 82' are then positioned on the transverse beams 80, only one of which is visible in FIG. 6, and the nailing procedure is duplicated for such second row of boards, in the manner above described. It will be noted that the posts 130 and 132 in FIG. 6 are vertically adjusted relative to their position as shown in FIG. 5 so as to raise the nailer 44 for operating at the higher level due to the inverting of the partially completed pallet. The latch mechanism previously described retains the posts 130 and 132 in such adjusted position.

Referring to FIG. 7, this figure shows the nailing operation on the pallet in its inverted, FIG. 6 position.

It will thus be seen that the objects of the invention have been achieved. The pallet jigs permit the transverse beams and boards to be nailed thereto to be accurately positioned prior to nailing. The adjacently disposed jigs and the air nailer rotatably mounted from the center post between such jigs permits efficient nailing at both of such jigs by a single operator thereby greatly facilitating production of the pallets. The entire jig and table assembly is relatively simple in construction and highly efficient in use, with the construction of the component parts of the entire apparatus being such that little or no maintenance is required.

I claim:

1. A jig assembly for manufacturing pallets comprising:
   a. a pair of jigs mounted on a supporting table, each jig being formed with longitudinal and transverse frame members for supporting beam components of a pallet to be formed prior to nailing of further pallet components thereto, resiliently mounted keeper arms pivotally mounted on said frame members for biasing said beam components against said transverse frame members for accurately aligning said beam components in said jig,
   b. means for supporting said jig at a convenient working height,
   c. a post mounted between said jigs and extending upwardly therefrom,
   d. a nailer means for nailing top and bottom rows of said further pallet components to said beams, and
   e. means for pivotally mounting said nailer means for pivotable, swinging movement about said post whereby said nailer means can be moved to any area above either of said jigs for effecting the nailing operation, said mounting means comprising a first swing arm pivotally mounted to said post and a second swing arm pivotally mounted at one end to said first arm and operatively connected at its other end to said nailer means, said arms being disposed in generally horizontal planes above said jigs.

2. The jig assembly of claim 1 further including a pneumatic control line extending upwardly through said post and connected to said nailer means for pneumatically operating the same.

3. The jig assembly of claim 1 wherein each of said transverse frame members are generally L-shaped in cross section for receiving the pallet beams.

4. The jig assembly of claim 3 wherein said keeper arms are connected at one end to spring means fixedly mounted at their other ends to one of said longitudinal frame members, said keeper arms engaging keeper posts extending upwardly from said one longitudinal frame member, with said keeper arms being biased by said springs about said keeper posts to resiliently engage beams positioned between the outer, free end of said keeper arms and the adjacently disposed transverse frame members thereby to retain said beams in aligned position on said frame members.

5. The jig assembly of claim 4 further including support brackets located at each corner of said pallet frame and extending vertically above said transverse frame members, said support brackets serving to support a partially formed pallet when the same has been inverted to permit application of the second supporting layer on said transverse beams.

6. The jig assembly of claim 1 wherein said operative connection between said nailer means and said second swing arm comprises a first generally hollow post operatively connected to said swing arm through a bracket fixed to the free end of said second swing arm, a second post telescopically received within said first post and operatively connected to a mounting plate carrying said nailer means, and latch means carried by said first telescoping post and including means engageable with said second post for maintaining said posts in a relatively adjusted position at a predetermined height above said pallet jigs.

7. The jig assembly of claim 6 further including spring means operatively connected to said second telescopic post for urging the same and thus said nailer means upwardly away from said pallet jigs, the lowering of said nailer means functioning to compress said spring thereby conditioning the same for withdrawal following release of said nailer means subsequent to the nailing operation, and handle means provided on said mounting plate for said nailer means to facilitate vertical movement of said nailer means toward and away from said jigs.

8. The jig assembly of claim 7 further including a shaft threaded to said mounting plate for said nailer means, said spring extending around the upper end of said shaft and being compressed during vertical downward movement of said nailer means.

* * * * *